United States Patent [19]
Wright

[11] Patent Number: 6,099,133
[45] Date of Patent: Aug. 8, 2000

[54] BODY SUPPORTED MIRROR

[76] Inventor: Jane B. Wright, 3300 Binnacle Dr. Apt. #111, Naples, Fla. 34103

[21] Appl. No.: 08/914,843

[22] Filed: Aug. 18, 1997

[51] Int. Cl.$^7$ .................................................... G02B 7/182
[52] U.S. Cl. ........................................... 359/880; 359/879
[58] Field of Search ..................................... 359/871, 872, 359/879, 880, 815, 881; 2/46, 267, 463; 248/476, 479

[56] References Cited

U.S. PATENT DOCUMENTS

| 439,001 | 10/1890 | Greenwood | 359/879 |
|---|---|---|---|
| 2,071,243 | 2/1937 | Tripp | 359/880 |
| 2,117,403 | 5/1938 | Crosby | 359/880 |
| 2,327,096 | 8/1943 | Dann | 359/880 |
| 4,657,003 | 4/1987 | Wirtz | 128/133 |
| 4,707,087 | 11/1987 | Van Zandt | 359/880 |

*Primary Examiner*—Ricky D. Shafer
*Assistant Examiner*—Mark A. Robinson

[57] ABSTRACT

A body supported mirror combination which includes a tube-like support which is draped around the neck of a wearer. The material of the tube is preferably made of a knitted fabric. The tube itself is filled with a kernel-type material to render the tube structure pliable so that it can drape itself around the neck of a wearer and so that it can conform itself to the chest contours of different wearers. The tube can be adjusted to different lengths. A stabilizing plate is removably attached to the front of the tube-like structure at the chest area of a wearer. A hook-type material is attached to the interior of a semi-circular claw which is part of the stabilizing plate which hooks will connect themselves with the loops of the knitted material when the claw is draped over the tube-like structure. A flexible goose neck at one end is attached to the stabilizing plate and another end thereof has an adjustable mirror attached thereto. The various adjustabilities of the mirror allow the same to be adjusted for different uses, that is, in one position the mirror can placed in the front of a user for make-up purposes or in an over the shoulder position so that it can used as a rearview mirror for bicycling or roller blading, for example.

6 Claims, 3 Drawing Sheets

BODY SUPPORTED MIRROR

BACKGROUND OF THE INVENTION

This invention relates to a mirror which is supported on the body of a wearer particularly in the chest area of a wearer. It is quite versatile in that the mirror can be used during make-up time or while shaving. The mirror itself can be double sided having a flat mirror on one side and a concave mirror on the other side. The mirror itself is supported by a flexible goose neck which in turn is connected to a support carried by the wearer. This arrangement enables the user to adjust the mirror in many different directions and different angles so that the mirror can be used for many different purposes and different activities. This includes the use as a rearview mirror when bicycling or roller blading, for example. This also includes fixing the back of clothing which otherwise cannot be observed.

DESCRIPTION OF THE PRIOR ART

It is acknowledged that body supported mirrors are well known as shown in U.S. Pat. No. 439,001, for example. This mirror is supported by a flexible band d which passes around the neck of the wearer to which a pad c is slidably attached. The mirror a is supported by a bracket b which can swivel on pad c and allows the mirror a to swivel on itself. The bracket b does not allow any further adjustments of the mirror.

U.S. Pat. No. 2,071,243 to Tripp shows a mirror support 24 which is a rigid wire 24 which hooks around the neck of a wearer and loop 28 connects a rigid support wire 10 with its own loop 12 by way of a screw 30 and wing nut 32 to obtain up and down adjustments. The supports 18 allow the mirror 44 to exhibit either a flat or concave side. No further adjustments are contemplated in this patent.

U.S. Pat. No. 2,117,403 to Crosby shows a body supported mirror which has a body supported frame hooked around the neck of a wearer which has a stabilizing frame 27, 19 which supports two support arms 18 connected by a portion 25. No further adjustments are contemplated. The hook 29, of course, can swivel around the neck of a wearer. The support arms 18 allow the mirror to be moved up and down and the mirror 11 can swivel around its own support 15 to exhibit either a flat or a concave side.

U.S. Pat. No. 2,327,096 also shows a body supported mirror which in its execution seems to be rather complicated because a basic "LUCITE" frame 34 is supported around the neck of a wearer by way of a simulated leather strap 9. A rigid standard 5 is connected to the rigid frame 34 by way of a double jointed connection 8. This connection allows the standard 5 to swivel left and right or up and down when seen from the front. The mirror 1 can swivel on standard 5.

U.S. Pat. No. 4,707,087 also involves a rather complicated mirror supported by the body of a user. A tray 14 is supported on the body of a user by a strap 44. Various joints 38, 64 and 66 support the mirror 80 so that it can be adjusted in many up and down positions but not in any lateral positions.

OBJECTS OF THE INVENTION

An object of the invention is to support a rearview mirror on a tube-like support surrounding the neck of a wearer. The tube-like support takes the shape of a sock which is filled with a granular material of the size such as rice, rough sand or the plastic little balls or kernels which are used in the "Beany Dolls" creating a soft but manageable mass within. A goose neck-like structure is supported on the tube-like support to be adjustable in many different directions.

DETAILED DESCRIPTION OF THE PREFERRED EMBODIMENT

Figure 1:
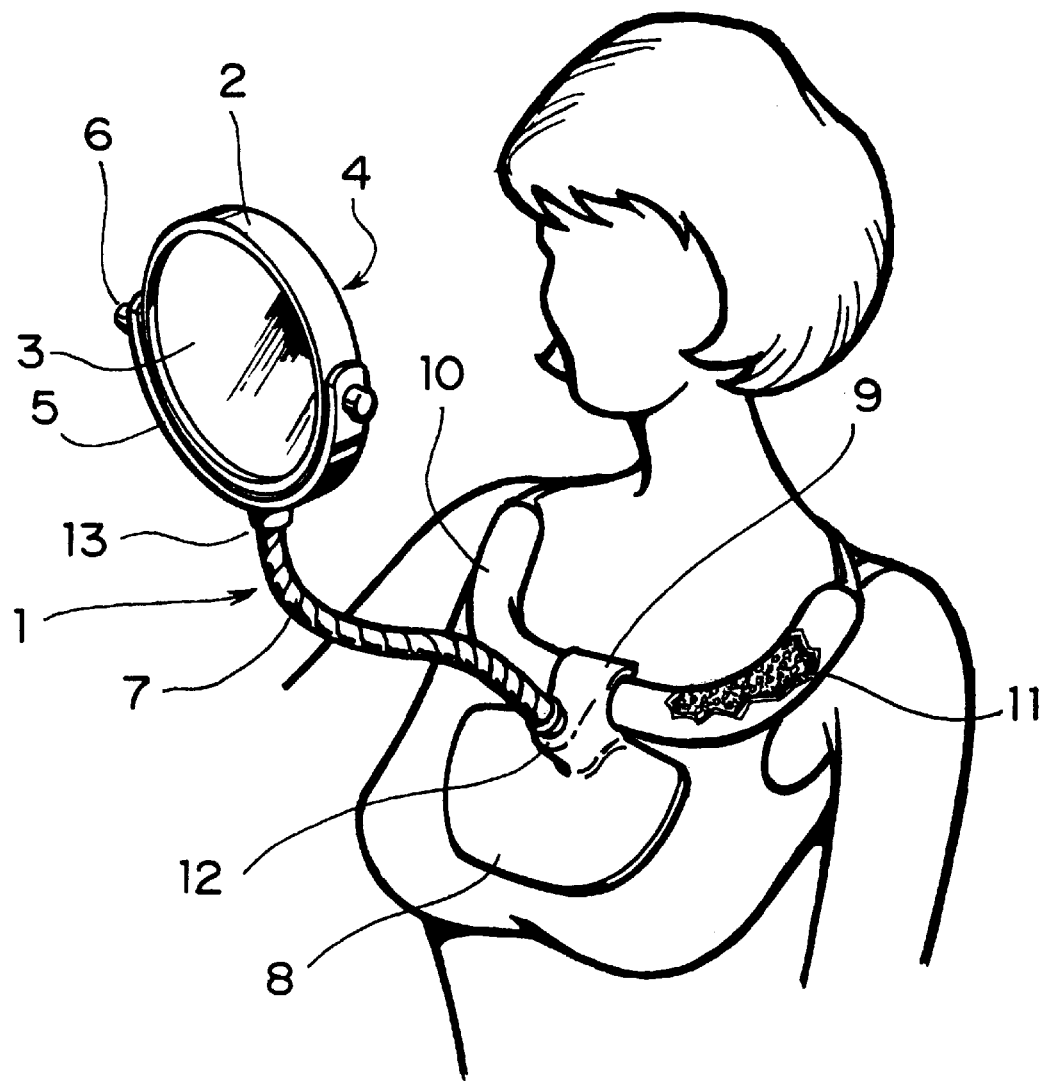
FIG. 1 shows the mirror as it is worn on a person.

Referring now to FIG. 1, the numeral 1 refers to the overall mirror-support combination. The mirror 2 has two sides 3, the flat side and 4, the concave side. The mirror 2 itself is supported on a U-shaped support 5. The U-shaped support can be eliminated in that the mirror 2 can be directly supported on the goose neck 7 by a swivel connection (not shown) so that the mirror 2 can be turned so as to exhibit either face 3 or 4 simply by turning it in its swivel support. The mirror 2 is supported by a goose neck 7 at a connection joint 13 at one end to a plate 8 which in turn is supported or connected with another connection joint 12 at its other end to a tube-like structure 10. Plate 8 is a stabilizing plate which will stabilize the weight of the mirror and goose neck combination against the contour of the chest of the wearer, although the weight of the mirror as well as the goose neck is kept at a minimum. The plate 8 is supported on the sock-like or tube-like support around the neck of a wearer by a semi-circular claw 9 that partially surrounds the sock-like support 10. The sock-like or tube-like support is preferred to be made of knitted material so as to be pliable and to be able to assume a draping characteristic around the neck of the wearer. Of course, the tube or sock has to be filled with a coarse granular material 11 of a size such as rice, granular sand or the plastic kernels that are found in the "Beany Dolls" that children enjoy.

It is contemplated that the sock-like support be washable after extensive use and therefore, anything hostile to moisture should not be used within this structure. Therefore, the plastic kernels used in the "Beany Dolls" are preferred.

Figure 2:
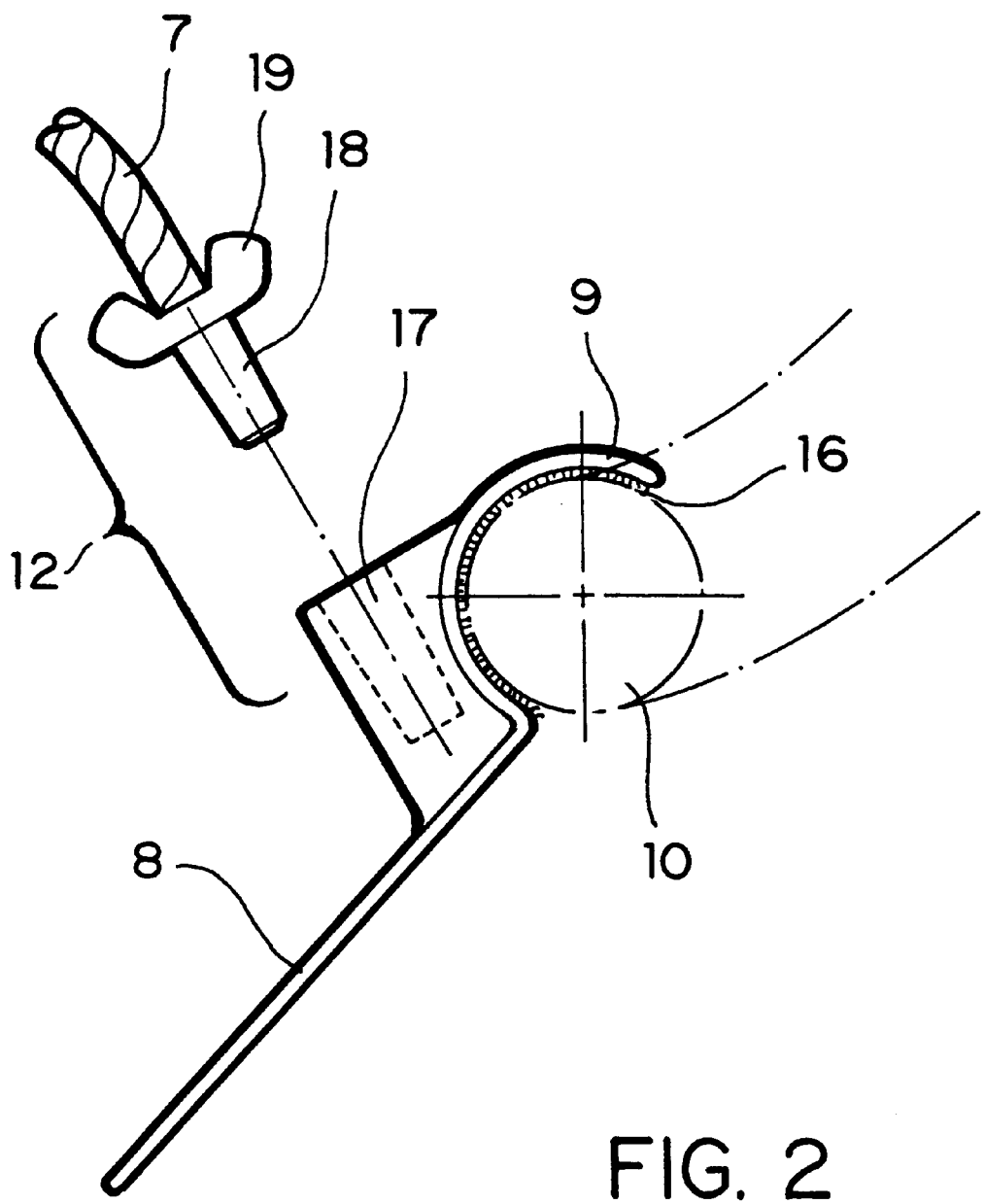
FIG. 2 shows details of how a goose neck is fastened to a support plate.

Turning now to FIG. 2, there are shown the details of a preferred connection joint 12 for connecting the goose neck 7 to the stabilizing plate 8. To this end, there is a socket 17 which is tapering inwardly to create a female receptacle and the goose neck has a male extension 18 having a shape conforming to the shape of the socket 17. This then creates a form fitting structure whereby, when pushing the extension 18 into the socket 17, a frictional or form fitting fit will retain the goose neck 7 on the stabilizing plate 8. Thereby it can be seen that the rotational orientation of the goose neck and thereby the mirror can easily be controlled. The wing nut 19 is desirable because it can be grasped with the fingers of a user to break the frictional connection to separate the goose neck 7 from the stabilizing plate 8. FIG. 2 also shows the semi-circular claw 9 which partially surrounds the tube-like structure 10. In order to obtain a slip-proof connection between the tube 10 and the claw 9, the male hooks of a male-female connector 16 known under the TM "VELCRO" has been fastened to the inside semi-circle of claw 9. It has been explained above that the tube-like structure 10 should be made of a knitted material. Therefor, whenever the stabilizing plate 8 with its claw 9 is placed over the tube 10, the male hooks of material 16 will capture the loops of the knitted material immediately to thereby keep the overall rearview combination at its proper orientation. This will greatly facilitate the body characteristics of the user. The frontal chest contours of a male or a female user are quite different and, therefore, this type of connector instantly accounts for this difference. The stabilizing plate 8 with its lower margin lies against the chest of the wearer while the weight of the tube-like structure 10 keeps the upper margin of plate 8 in its proper orientation.

Figure 3:
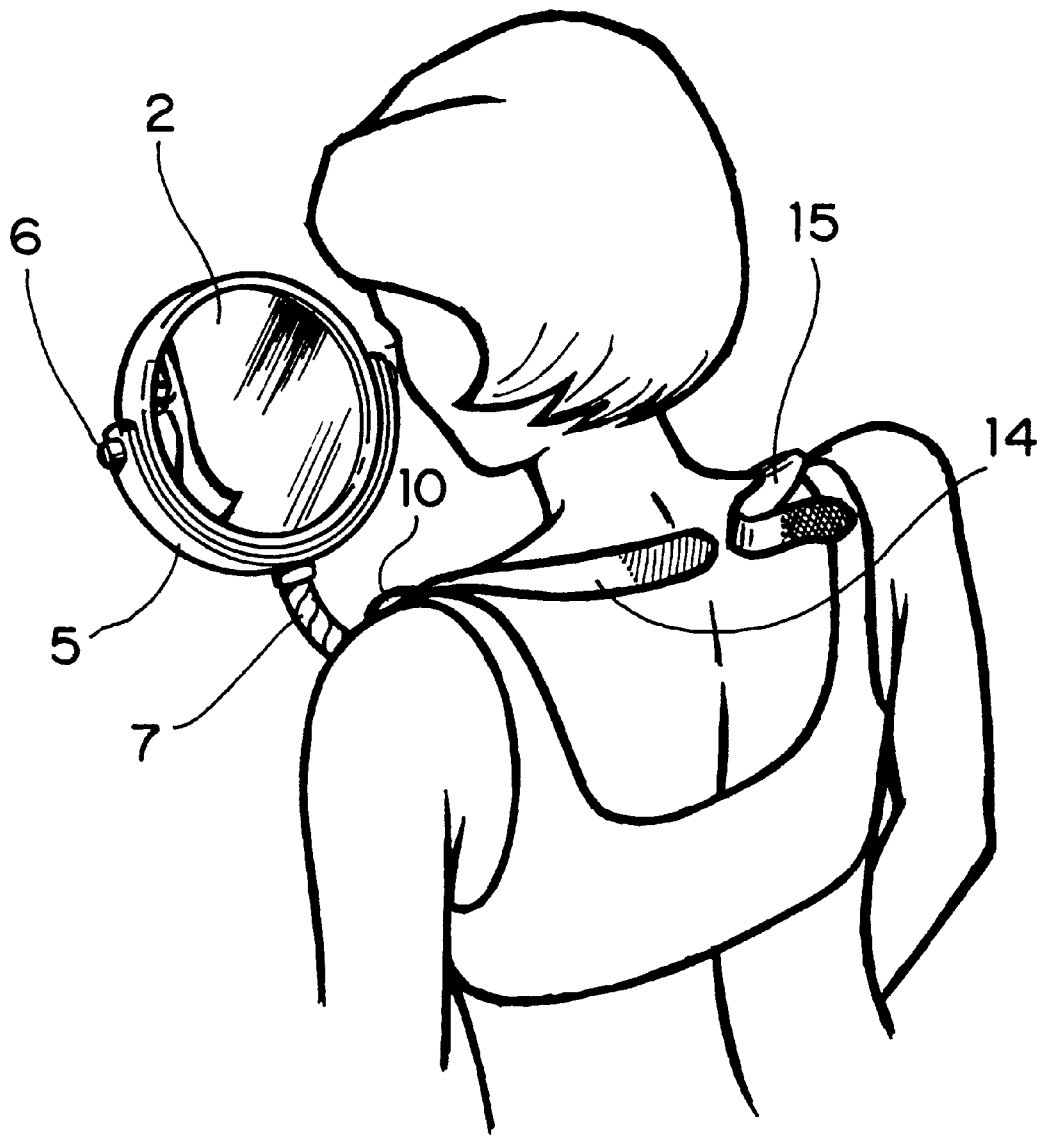
FIG. 3 shows details of how the mirror support is fastened around the neck of a wearer.

Turning now to FIG. 3, there is shown the mirror arrangement as seen from the back of a wearer. Elements discussed earlier are shown with like reference characters. The tube-like support 10 is shown over the left shoulder of the wearer which would constitute the end of the tube. Attached to each end of the tube 10 are hook and loop-type straps 14 and 15, respectively, which will engage with each other where ever they meet. Thus it can be seen that the tube-like structure can be length adjusted on the chest of the wearer in that various lengths are desirable. For example, when the mirror combination is to be used for make-up purposes, the tube should be somewhat lower to bring the mirror more in line with the face of the user, while, when used as a rearview mirror, the mirror itself should be somewhat higher because it should be at a height over the shoulder of a wearer. It should be understood that many length adjusting devices could be used as equivalents of the hook and loop-type fasteners. For example, for simplicity reasons, two ribbons could be attached to the ends of the tube 10 which simply are tied together in the form of a bow. A loop of fabric could be attached to each end of the tube 10 and a ribbon forming a bow could tie the loops together according to the length requirement. The pin and hole arrangement found as a length adjuster at the back of caps could used for this purpose.

It can now be seen that this disclosed mirror-support combination is quite novel in its construction over the prior art uncovered and discussed above. None of the prior art shows a pliable tube-like support on the body of the wearer which is filled with kernels to give it body so that it can conform itself to different contours of different users. None of the prior art shows the supports to be length adjustable. None of the prior art shows the novel stabilizing plate. None of the prior art cited above shows the use of a flexible goose neck and the manner by which it is attached to the stabilizing plate.

What I claim is:

1. A body supported mirror combination including a tube-shaped knitted fabric structure having been filled with a coarse granular material being draped around the neck of a wearer, said tube-shaped structure having means for adjusting the length of the tube-shaped structure, a stabilizing plate removably attached to the tube-shaped structure in front of the chest area of a user, a flexible goose neck attached at one end to said stabilizing plate and an adjustable mirror attached to the other end of said goose neck.

2. The mirror combination of claim 1 including a semi-circular claw on said stabilizing plate which drapes over said tube-shaped structure.

3. The mirror combination of claim 2, wherein an inner circumference of said claw has a hook-like material attached thereto so that hooks of the hook-like material may attach themselves to loops of said knitted fabric structure to form a separable connection.

4. The mirror combination of claim 1, including a male extension and female socket combination for attaching said one end of said goose neck to said stabilizing plate.

5. The mirror combination of claim 4, wherein said male extension and said female socket combination is tapered so that when pressed into each other a frictional or form fitting joint is established.

6. The mirror combination of claim 5, including a manipulative means for breaking a connective force the frictional or form fitting joint.

* * * * *